(12) United States Patent
Bank et al.

(10) Patent No.: US 9,146,127 B2
(45) Date of Patent: Sep. 29, 2015

(54) NAVIGATION SYSTEM PROVIDING LANE GUIDANCE TO DRIVER BASED ON DRIVER'S DRIVING HABITS AND PREFERENCES

(75) Inventors: Judith H. Bank, Morrisville, NC (US); Lisa M. Bradley, Cary, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 13/535,170

(22) Filed: Jun. 27, 2012

(65) Prior Publication Data

US 2014/0005923 A1    Jan. 2, 2014

(51) Int. Cl.
*G01C 21/34* (2006.01)
*G01C 21/36* (2006.01)

(52) U.S. Cl.
CPC ............ *G01C 21/3658* (2013.01); *G01C 21/34* (2013.01); *G01C 21/3484* (2013.01); *G01C 21/3617* (2013.01); *G01C 21/3641* (2013.01)

(58) Field of Classification Search
CPC ............... G01C 21/34; G01C 21/3484; G01C 21/3617; G01C 21/3658; G01C 21/3641
USPC ........................................................ 701/424
See application file for complete search history.

(56) References Cited

U.S. PATENT DOCUMENTS

| | | | |
|---|---|---|---|
| 6,427,118 B1 * | 7/2002 | Suzuki | 701/438 |
| 7,085,633 B2 | 8/2006 | Nishira et al. | |
| 7,224,290 B2 | 5/2007 | Takenaga et al. | |
| 7,471,212 B2 | 12/2008 | DeKrautter et al. | |
| 8,332,141 B2 * | 12/2012 | Couckuyt | 701/430 |
| 8,417,448 B1 * | 4/2013 | Denise | 701/410 |
| 8,681,635 B2 * | 3/2014 | Nesbitt et al. | 370/238 |
| 8,838,318 B2 * | 9/2014 | Segawa et al. | 701/22 |
| 8,855,901 B2 * | 10/2014 | Leader et al. | 701/117 |

(Continued)

FOREIGN PATENT DOCUMENTS

DE    102007051543 A1 *    4/2009

OTHER PUBLICATIONS

"Garmin Nuvi 2370LT 4.3"Bluetooth GPS w/Traffic, Lane Assist," http://www.qvc.com/qic/qvcapp.aspx/view.2/app.detail/params.item.E246163.desc.Garmin-Nuvi-2370LT-43-Bluetooth-GPS-wTraffic-Lane-Assist/walk.yah.0103~1680~2338?&cookie=set, 2011.

(Continued)

*Primary Examiner* — Tuan C. To
(74) *Attorney, Agent, or Firm* — Robert A. Voigt, Jr.; Winstead, P.C.

(57) ABSTRACT

A method, system and computer program product for providing lane guidance to a driver of a vehicle. Based on the current location of the vehicle, the navigation system determines a route to travel from the current location of the vehicle to a destination provided by the driver. The navigation system obtains one or more of the following types of information which is used to determine whether the navigation system should recommend a lane change: past driving patterns of the driver, driver's lane preferences, past driving history of other drivers on the route, external conditions (e.g., weather) and features of the route. The recommendation may be presented to the driver via an audio instruction and/or on a display. In this manner, the navigation system instructs the driver as to which lane in a multi-lane road the user should drive on taking into consideration the user's driving habits and preferences.

20 Claims, 5 Drawing Sheets

(56) References Cited

U.S. PATENT DOCUMENTS

| | | |
|---|---|---|
| 2004/0249535 A1 | 12/2004 | Maass et al. |
| 2006/0276962 A1* | 12/2006 | Yoshioka et al. ............ 701/208 |
| 2008/0036626 A1 | 2/2008 | Kim |
| 2009/0319171 A1* | 12/2009 | Nakayama et al. ........... 701/201 |
| 2009/0326814 A1* | 12/2009 | Harumoto et al. ............ 701/210 |
| 2010/0185384 A1* | 7/2010 | Naito et al. .................... 701/200 |
| 2011/0109475 A1* | 5/2011 | Basnayake et al. ........... 340/902 |
| 2011/0125397 A1* | 5/2011 | Lee ............................... 701/201 |
| 2011/0231063 A1* | 9/2011 | Kim ............................... 701/41 |
| 2012/0029801 A1* | 2/2012 | Yano et al. .................... 701/118 |
| 2012/0035843 A1* | 2/2012 | Miura et al. .................. 701/123 |
| 2012/0179361 A1* | 7/2012 | Mineta et al. ................. 701/410 |
| 2013/0311081 A1* | 11/2013 | Yamakawa et al. ........... 701/428 |

OTHER PUBLICATIONS

IBM, "System and Method to Ensure Road Lane Safety and Track Issues During Inclement Weather," http://www.ip.com/pubview/IPCOM000187491D, Sep. 8, 2009.

Carstens, J. et al., "Method and System for Traffic Flow Control," http://www.ip.com/pubview/IPCOM000156093D, Aug. 20, 2007.

Anonymous; "A Computing Model for Real-Time Traffic Data Processing," http://priorartdatabase.com/IPCOM000211243D, Sep. 29, 2011.

* cited by examiner

NAVIGATION SYSTEM PROVIDING LANE GUIDANCE TO DRIVER BASED ON DRIVER'S DRIVING HABITS AND PREFERENCES

TECHNICAL FIELD

The present invention relates generally to vehicle-based Global Positioning Systems (GPS), and more particularly to a navigation system providing lane guidance to the driver based on the driver's driving habits and preferences, the features of the road, external conditions (e.g., weather) and other drivers' past experience (e.g., accidents) on the road.

BACKGROUND

There is an increasing use of Global Positioning System (GPS)-based navigation systems in vehicles. Such navigation systems receive signals from an array of satellites which are part of the GPS. Based on received signals, GPS-based navigation systems may identify a vehicle's location in terms of latitude and longitude. The navigation system may also detect the vehicle's speed and direction of travel. With geographic information stored in an on-board computer in the vehicle, the navigation system is capable of audio-visually communicating to a user instructions for reaching a given destination.

Many drivers tend to drive towards one side of a lane, such as when they are driving on an unfamiliar narrow road or when they are driving on a lane near a steep drop or a cliff. For example, a driver may veer to the side of the lane away from the cliff or steep drop as the driver is timid about driving too close to the edge of the cliff or steep drop.

Furthermore, many drivers may have a preference for not driving in a particular lane, such as the outside lane on a suspension bridge.

Currently, GPS-based navigation systems only suggest one or more routes to the desired destination based on the map data and the user's present position. The GPS-based navigation systems do not instruct the driver as to which lane in a multi-lane road the user should drive on taking into consideration the user's driving habits and preferences.

BRIEF SUMMARY

In one embodiment of the present invention, a method for providing lane guidance to a driver of a vehicle comprises receiving a destination from the driver of the vehicle. The method further comprises identifying a current location of the vehicle. Additionally, the method comprises determining a route to travel from the current location of the vehicle to the destination. Furthermore, the method comprises obtaining one or more of the following: past driving patterns of the driver of the vehicle, driver's preferences concerning lane preferences, and features of the route. In addition, the method comprises recommending, by a processor, to the driver of the vehicle a particular lane on the route to drive on based on one or more of the following: the past driving patterns of the driver of the vehicle, the driver's preferences concerning lane preferences, and the features of the route.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for providing lane guidance to a driver of a vehicle. In one embodiment of the present invention, the navigation system receives a destination from the driver of the vehicle. Based on the current location of the vehicle, the navigation system determines the route to travel from the current location of the vehicle to the destination. The navigation system obtains one or more of the following types of information which is used to determine whether the navigation system should recommend a lane change: past driving patterns of the driver, driver's preferences concerning lane preferences, past driving history of other drivers on the route, external conditions (e.g., weather) and features of the route. The recommendation may be presented to the driver by the navigation system via an audio instruction and/or on a display. In this manner, the navigation system instructs the driver as to which lane in a multi-lane road the user should drive on taking into consideration the user's driving habits and preferences.

While the following discusses the present invention in connection with a GPS-based navigation system in a vehicle, the principles of the present invention may be applied to any GPS-based device, including smartphones. A person of ordinary skill in the art would be capable of applying the principles of the present invention to such implementations. Further, embodiments applying the principles of the present invention to such implementations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
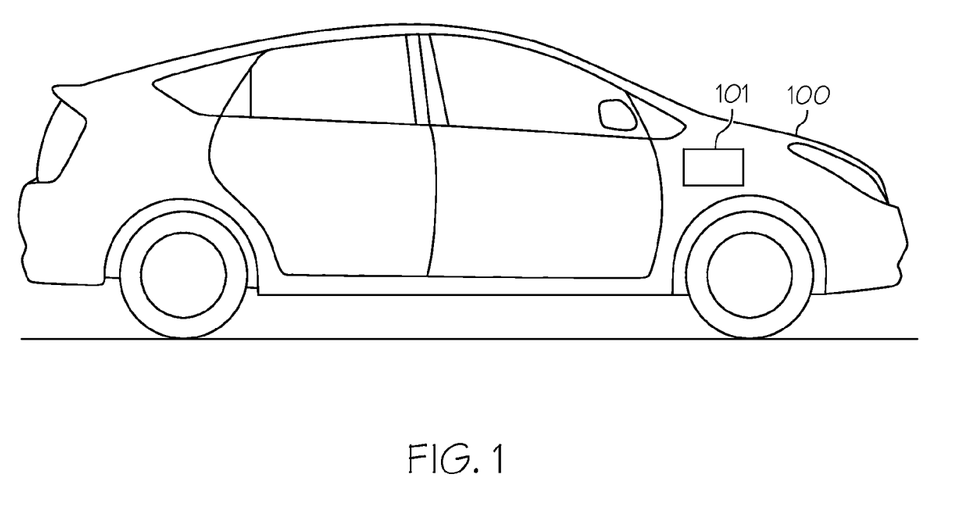
FIG. 1 illustrates a vehicle with a navigation system according to one embodiment of the present invention.

Referring now to the Figures in detail, FIG. 1 illustrates a vehicle 100 with a navigation system 101 according to one embodiment of the present invention. The basic navigation system 101 is shown in greater detail in FIG. 2.

Figure 2:
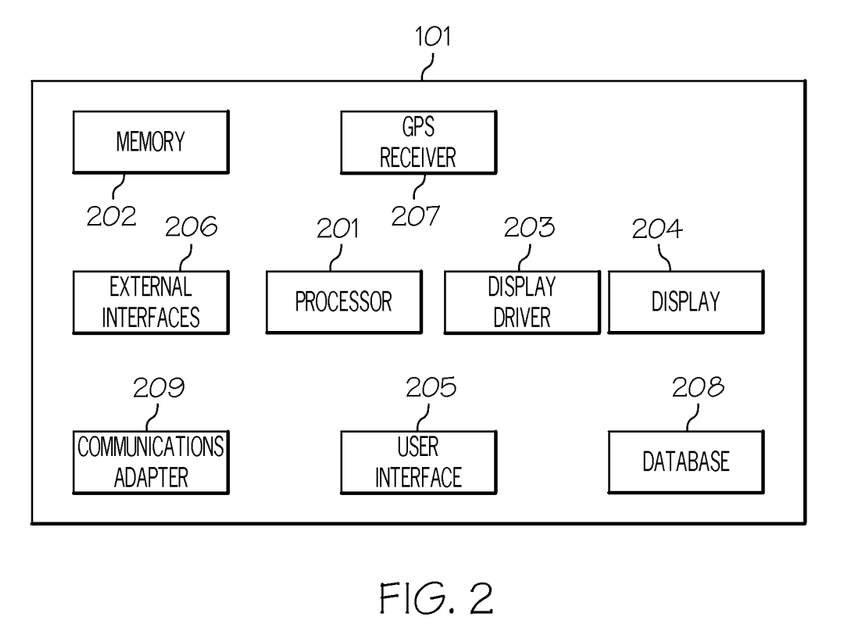
FIG. 2 illustrates an embodiment of the present invention of the navigation system.

FIG. 2 illustrates an embodiment of the present invention of navigation system 101 (FIG. 1). Referring to FIG. 2, navigation system 101 includes a processor 201, a memory 202, a display driver 203, a display 204, a user interface 205, external interfaces 206 and a Global Positioning System (GPS) receiver 207.

Memory 202 is used to store software and data for processor 201 to carry out various operations of navigation system 101. In this instance, the stored software may include a navigator web browser for browsing information provided, e.g., by servers connected to the Internet. In particular, the navigator browser works compatibly with the standard hypertext transfer protocol (HTTP), hypertext markup language (HTML), virtual reality markup language (VRML), graphics interchange format (GIF), JAVA applets, etc. In one embodiment, the stored software may further include an application for providing lane guidance to a driver of a vehicle as discussed further below in connection with FIGS. 3-6.

Display 204 may include a conventional liquid crystal display (LCD). Through display driver 203, processor 201 controls the display of text and graphics on display 204 in a predetermined format. User interface 205 may comprise conventional audio circuitry including a microphone and speaker for the user to communicate with navigation system 101 via audio media. User interface 205 may also comprise an indicator device, e.g., a mouse, touchpad, roller ball, or a combination thereof, which may enable a user to move a cursor on display 204 and to point and click at a displayed option or an icon to select same. In addition, user interface 204 may incorporate well-known touch-screen circuitry (not shown). With this circuitry, the user can interact with processor 201 by using a finger or a stylus to touch the surface of display 204, which is tactile-sensitive. Processor 201 receives from the touch screen circuitry a signal identifying the location on display 204 where it has been touched. If such a location matches the predetermined location of one of displayed options or icons, processor 201 determines that the option or icon has been selected. Otherwise, a cursor is placed at the touched location on display 204, prompting for an input from the user.

The user input may be realized using a virtual keyboard shown on display 204 also provided by the touch-screen circuitry. In a well known manner, characters are input by touching the corresponding keys on the virtual keyboard. Alternatively, processor 201 may be programmed to recognize handwritten characters, and may receive through the touch-screen circuitry images of characters drawn by the user on display 204. Any recognized characters corresponding to the drawn images then become the user input. Still alternatively, through one of external interfaces 206, navigation system 101 can be connected to a keyboard device or a personal computer (PC) having a keyboard for user input. In any of these manners, the user may input a destination to navigation system 101.

In one embodiment, navigation system 101 includes a database 208 that is configured to store map data that is used by navigation system 101 to provide driving directions to the driver of vehicle 100 to arrive at a destination from a current location of vehicle 100. In one embodiment, database 208 is configured to store the past driving patterns of the driver of vehicle 100 concerning lane preferences. For example, such historical information may include detecting the driver driving towards a left or a right side of a lane, avoiding narrow lanes, lane utilization (e.g., drivers stays in one lane all the time, prefers the right lane), switching lane frequency (e.g., zooms in and out of lanes), voluntarily merging into a lane (e.g., merges into other lanes without issues), a driving speed in comparison to a speed limit (e.g., user tends to drive under the speed limit), a driving speed in comparison to other traffic, etc. Such information may be used by navigation system 101 to recommend to the driver of vehicle 100 a particular lane to drive on. For example, if the user tends to drive under the speed limit, then navigation system 101 would not recommend that the driver drive in the leftmost lane. In another example, if the user tends to stop in a lane when having to merge, then navigation system 101 would avoid making the user merge quickly. In another example, if a driver is driving in a four lane road and tends to never drive in the center of the lane, then navigation system 101 may suggest to drive in the right lane versus the left lane if the right lane is a little bit wider than the left lane due to having a shoulder. In one embodiment, such information may be populated in database 208 by navigation system 101 tracking the driver's driving patterns as discussed below in connection with FIG. 3.

In one embodiment, database 208 may further store the driver's preferences concerning lane preferences. A discussion of storing the driver's preferences concerning lane preferences is provided further below in connection with FIG. 4. For example, the user (driver) may input to navigation system 101 the user's preferences concerning lane preferences such as avoiding a turning lane, a merging lane, a narrow lane, a lane near a steep drop, a lane near a high cliff, a lane near construction, a lane near a low guardrail, brush fires, truck lanes, bicycle paths, uneven pavement, farm vehicles, road hazards (e.g., flooding), etc. Other examples of driver's preferences include keeping the driver in a lane that will not change into a turning lane, notifying the driver a certain amount of time (e.g., 5 minutes) or a within a particular amount of distance (e.g., one mile) when navigation system 101 recommends to change lanes or merge into another lane, directing the driver to the lane that is furthest from construction work, etc. Such information may be inputted to navigation system 101 by the user using any of the means discussed above in connection with the description of FIG. 2. Such information may be used by navigation system 101 to recommend to the driver of vehicle 100 a particular lane to drive on. For example, if the driver has inputted a preference to avoid driving in turning lanes and the driver is driving in the right lane on a road where the right lane changes into a turning lane 5 miles ahead, and the user has further inputted to be warned at least 2 miles ahead of time when navigation system 101 recommends a lane change, then navigation system 101 may inform the driver to merge into the left lane in 3 miles.

In one embodiment, database 208 may further store information about the past driving history of other drivers, such as those drivers that have driven down a route determined by navigation system 101 to be traveled by the driver of vehicle 100. The past driving history of other drivers traveling down the determined route may be obtained from an external database that is downloaded by navigation system 101 to database 208. In such an embodiment, navigation system 101 queries such a database by connecting to a network (not shown) (e.g., a wireless wide area network, a Global System for Mobile Communications (GSM) network, Wireless Application Protocol (WAP) network, a WiFi network, an IEEE 802.11 standards network, various combinations thereof, etc.) via a communication adapter 209. For example, if the past driving history of other drivers indicates that drivers typically are aggressive and speed over a certain portion of the route, then navigation system 101 may recommend to the driver of vehicle 100 to drive in the right hand lane during this portion of the route if the driver is uncomfortable driving at high speeds and being surrounded by aggressive drivers. In another example, the past driving history of other drivers may indicate that drivers drive in a particular lane to avoid a road hazard (e.g., big bump). Such information may be used by navigation system 101 to recommend to the driver of vehicle 100 a particular lane to drive on.

In one embodiment, database 208 may additionally store information about the current external conditions (e.g., weather, sun, shade) along the route determined by navigation system 101 to be traveled by the driver of vehicle 100. Such external conditions may be provided to navigation system 101 via an external database or a website that is downloaded by navigation system 101 to database 208. In such an embodiment, navigation system 101 queries such a database or website by connecting to a network via communication adapter 209. Such information may be used by navigation system 101 to recommend to the driver of vehicle 100 a particular lane to drive on. For example, navigation system 101 may recommend the driver to drive in the right hand lane with a shoulder during a sever thunderstorm due to driving at a lower speed and access to the shoulder if needed. In another example, navigation system 101 may recommend to drive in a particular lane that is more in the shade or sun based on the driver's preferences.

In one embodiment, database 208 may further store the features of the route to be traveled by the driver of vehicle 100, such as the number of lanes, whether there is a barrier between oncoming traffic, the width of each of the lanes, the distance of a lane prior to becoming a turning lane, lane accident history (different lanes may have different rates of accidents), etc. In one embodiment, navigation system 101 obtains such information from an external database that is downloaded by navigation system 101 to database 208. In such an embodiment, navigation system 101 queries such a database by connecting to a network via communication adapter 209. Such information may be used by navigation system 101 to recommend to the driver of vehicle 100 a particular lane to drive on. For example, if there is a barrier between ongoing traffic and the user hugs the left side of a lane, then navigation system 101 may recommend driving in the left hand lane. In another example, if there is high accident rate in the left lane of a 4 lane road, then navigation system 101 may recommend to the driver to drive in the right lane.

While the preceding discussed various types of information that may be stored in database 208, the principles of the present invention are not limited to such information. Database 208 may store any type of information that may be used by navigation system 101 to provide lane guidance to the driver of vehicle 100. Furthermore, the principles of the present invention are not to be limited in scope to the examples provided above for the various types of information that may be used by navigation system 101 in determining whether to recommend a particular lane for the driver to drive on. Such examples were provided for illustration to aid in the understanding of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, many drivers tend to drive towards one side of a lane, such as when they are driving on an unfamiliar narrow road or when they are driving on a lane near a steep drop or a cliff. For example, a driver may veer to the side of the lane away from the cliff or steep drop as the driver is timid about driving too close to the edge of the cliff or steep drop. Furthermore, many drivers may have a preference for not driving in a particular lane, such as the outside lane on a suspension bridge. Currently, GPS-based navigation systems only suggest one or more routes to the desired destination based on the map data and the user's present position. The GPS-based navigation systems do not instruct the driver as to which lane in a multi-lane road the user should drive on taking into consideration the user's driving habits and preferences.

Figure 3:
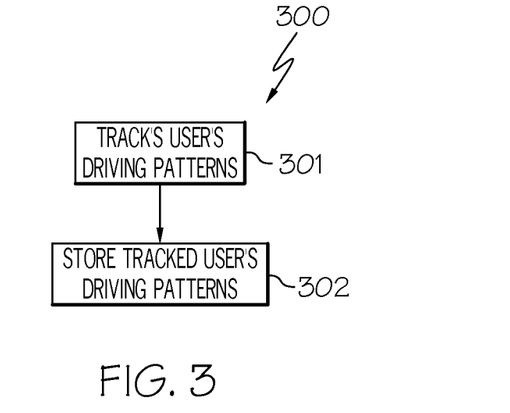
FIG. 3 is a flowchart of a method for obtaining the driving patterns of the driver of the vehicle in accordance with an embodiment of the present invention.
Figure 4:
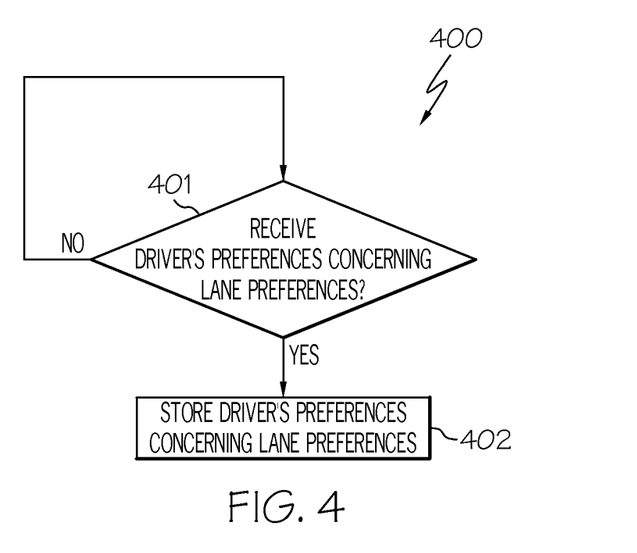
FIG. 4 is a flowchart of a method for obtaining the driver's preferences concerning lane preferences in accordance with an embodiment of the present invention.
Figure 5:
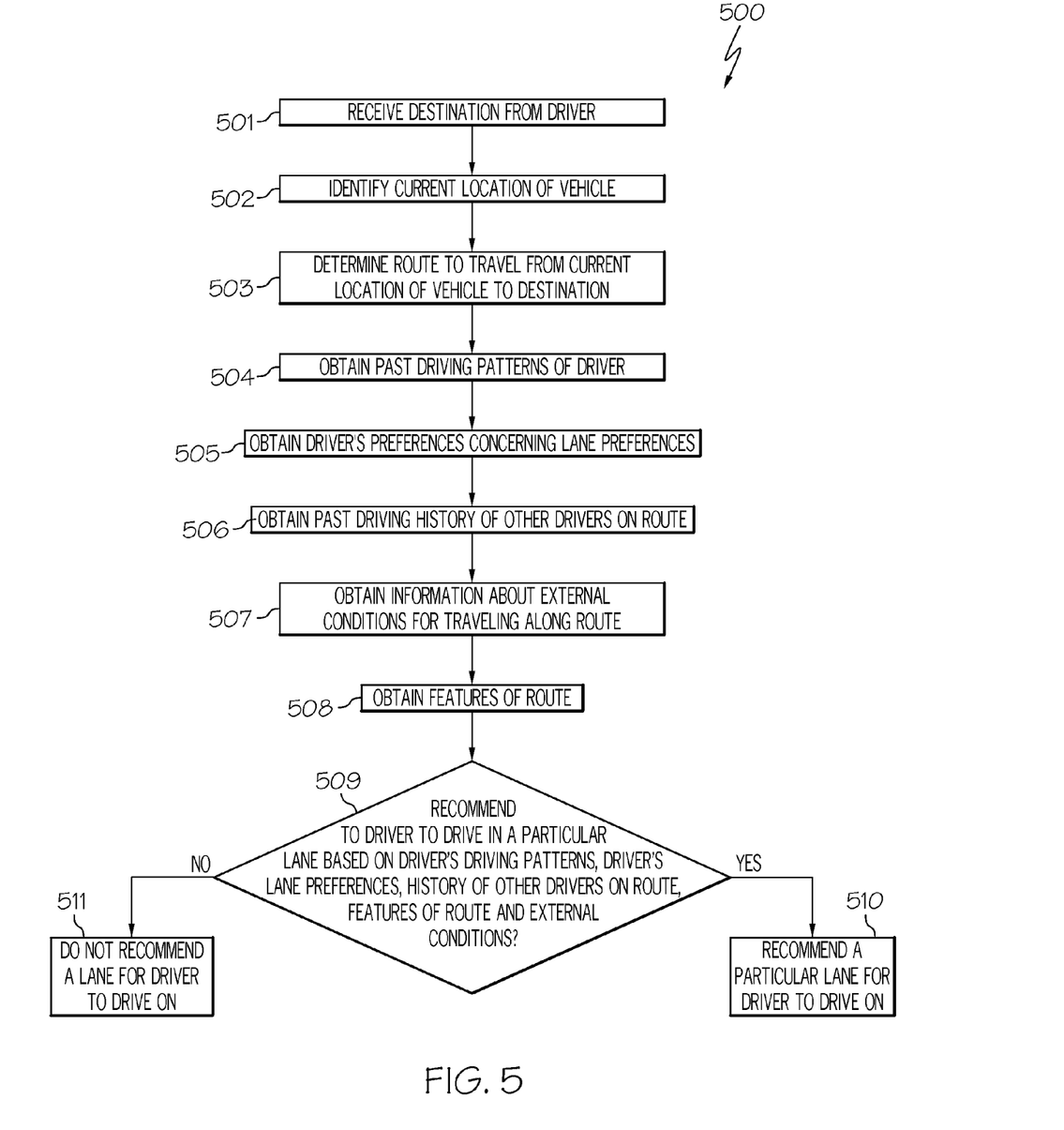
FIG. 5 is a flowchart of a method for providing lane guidance to the driver of the vehicle in accordance with an embodiment of the present invention.
Figure 6:
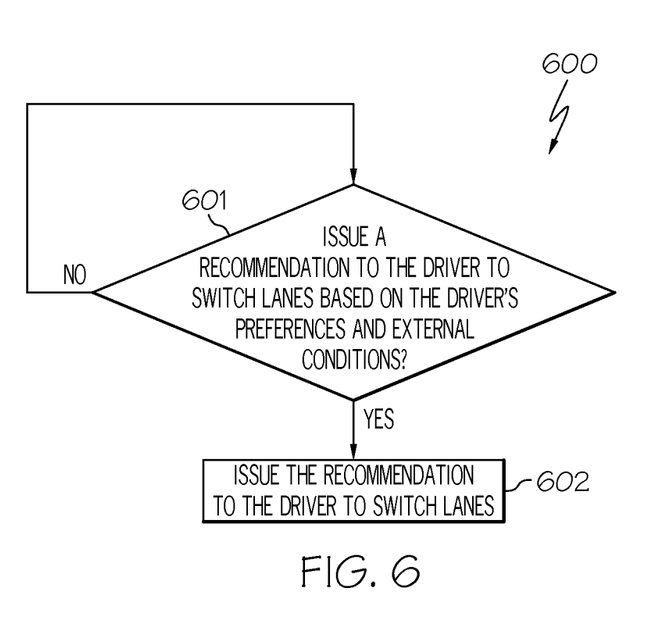
FIG. 6 is a flowchart of a method for when to notify the driver to switch lanes in accordance with an embodiment of the present invention.

The principles of the present invention provide a means for providing lane guidance to the driver of a vehicle as discussed further below in connection with FIGS. 3-6. FIG. 3 is a flowchart of a method for obtaining the driving patterns of the driver of the vehicle. FIG. 4 is a flowchart of a method for obtaining the driver's preferences concerning lane preferences. FIG. 5 is a flowchart of a method for providing lane guidance to the driver of the vehicle. FIG. 6 is a flowchart of a method for when to notify the driver to switch lanes.

As stated above, FIG. 3 is a flowchart of a method 300 for obtaining the driving patterns of the driver of the vehicle in accordance with an embodiment of the present invention. Such information is used by navigation system 101 (FIG. 1) to determine if the driver of the vehicle should be guided, such as via audio instructions, to drive on a particular lane of the road as discussed further below in connection with FIG. 5.

Referring to FIG. 3, in conjunction with FIGS. 1-2, in step 301, navigation system 101 tracks the user's driving patterns, such as whether the user hugs the left or right side of the lane, whether the user likes to drive in multiple lanes, whether the user zooms in and out of the lanes, whether the user tends to merge into lanes without any issues, whether the user stays in one lane all the time, whether the user prefers to drive in a particular lane, whether the user tends to stop in a lane when having to merge, whether the user tends to drive under or over the speed limit, etc. By navigation system 101 tracking the user's driving patterns, such information may be used by navigation system 101 to determine which lane the driver should drive on. For example, if the user tends to drive under the speed limit, the user should not be recommended to drive in the leftmost lane.

In step 302, navigation system 101 stores the tracked user's driving patterns in database 208.

In some implementations, method 300 may include other and/or additional steps that, for clarity, are not depicted. Further, in some implementations, method 300 may be executed in a different order presented and that the order presented in the discussion of FIG. 3 is illustrative. Additionally, in some implementations, certain steps in method 300 may be executed in a substantially simultaneous manner or may be omitted.

In addition to obtaining the user's driving patterns, navigation system 101 further obtains the driver's preferences concerning lane preferences as discussed below in connection with FIG. 4.

FIG. 4 is a flowchart of a method 400 for obtaining the driver's preferences concerning lane preferences in accordance with an embodiment of the present invention.

Referring to FIG. 4, in conjunction with FIGS. 1-2, in step 401, a determination is made by navigation system 101 as to whether it received the driver's preferences concerning lane preferences. The user (driver) may input to navigation system 101 the driver's preferences concerning lane preferences using any of the means discussed above in connection with the description of FIG. 2.

If navigation system 101 does not receive any driver's preferences concerning lane preferences, then navigation system 101 continues to determine whether it received the driver's preferences concerning lane preferences in step 401.

If, however, navigation system 101 receives the driver's preferences concerning lane preferences, then, in step 402, navigation system 101 stores such preferences in database 208.

In some implementations, method 400 may include other and/or additional steps that, for clarity, are not depicted. Further, in some implementations, method 400 may be executed in a different order presented and that the order presented in the discussion of FIG. 4 is illustrative. Additionally, in some implementations, certain steps in method 400 may be executed in a substantially simultaneous manner or may be omitted.

The driver's preferences concerning lane preferences and other information may be used by navigation system 101 to guide the driver to drive in a particular lane as discussed below in connection with FIG. 5.

FIG. 5 is a flowchart of a method 500 for providing lane guidance to the driver of vehicle 100 (FIG. 1) in accordance with an embodiment of the present invention.

Referring to FIG. 5, in conjunction with FIGS. 1-2, in step 501, navigation system 101 receives a destination from the driver of vehicle 100. For example, the user may input the destination by using a virtual keyboard shown on display 204.

In step 502, navigation system 101 identifies the current location of vehicle 101 using the received signals from an array of satellites which are part of the GPS.

In step 503, navigation system 101 determines the route to travel from the current location of vehicle 100 to the destination based on map data (e.g., map data stored in database 208).

In step 504, navigation system 101 obtains the past driving patterns of the driver, such as from database 208.

In step 505, navigation system 101 obtains the driver's preferences concerning lane preferences, such as from database 208.

In step 506, navigation system 101 obtains the past driving history of other drivers (such as those drivers that have driven on the route determined in step 503), such as from database 208.

In step 507, navigation system 101 obtains information about external conditions (e.g., weather) for traveling along the route determined in step 503, such as from database 208.

In step 508, navigation system 101 obtains the features of the route determined in step 503, such as from database 208.

Based on the information obtained in steps 504-508, in step 509, navigation system 101 determines whether to recommend to the driver to drive in a particular lane on the route. For example, navigation system 101 would suggest to the driver to drive in the left hand lane of a 4 lane road with a barrier between ongoing traffic if the driver's past driving history suggests that the user hugs to the left of the lane.

If the information obtained in steps 504-508 indicates that navigation system 101 should recommend a particular lane for the driver to drive on, then, in step 510, navigation system 101 recommends the appropriate lane for the driver to drive on. In one embodiment, such a recommendation may be in the form of an audio instruction. In another embodiment, such a recommendation may be presented via text and/or graphically, such as on display 204. In one embodiment, such a recommendation may be presented as both an audio instruction as well as text and/or graphically on display 204. In this manner, navigation system 101 instructs the driver as to which lane in a multi-lane road the user should drive on taking into consideration the user's driving habits and preferences.

If, however, the information obtained in steps 504-508 do not indicate that navigation system 101 should recommend a particular lane for the driver to drive on, then, in step 511, navigation system 101 does not recommend a lane for the driver to drive on.

In one embodiment, the analysis (step 509) as to whether to recommend to the driver to drive in a particular lane on the route determined in step 503 may be performed for a designated amount of distance (e.g., one mile) on the route determined to be traveled in step 503 and repeated thereafter. For example, navigation system 101 may determine whether to recommend to the driver to drive in a particular lane over the next mile. After traveling the mile, navigation system 101 may repeat the process in determining whether to recommend to the driver to drive in a particular lane over the following mile and so forth. In one embodiment, when the analysis of step 509 is repeated, method 500 may obtain the current external conditions (e.g., weather) in step 507 as well as obtain any other information that was updated, such as the past driving patterns of the driver, which may be updated while the driver is driving on the route determined in step 503 as navigation system 101 may be continually tracking and storing the user's driving patterns as discussed above in connection with method 300 of FIG. 3.

In some implementations, method 500 may include other and/or additional steps that, for clarity, are not depicted. Further, in some implementations, method 500 may be executed in a different order presented and that the order presented in the discussion of FIG. 5 is illustrative. Additionally, in some implementations, certain steps in method 500 may be executed in a substantially simultaneous manner or may be omitted.

As discussed above, in connection with FIG. 5, if the information obtained in steps 504-508 indicates that navigation system 101 should recommend a particular lane for the driver to drive on, then, in step 510, navigation system 101 recommends the appropriate lane for the driver to drive on. As to the timing of issuing the recommendation to the driver to switch lanes, navigation system 101 issues the recommendation based on the driver's preference, current external conditions (e.g., weather), etc. as discussed below in connection with FIG. 6.

FIG. 6 is a flowchart of a method 600 for when to notify the driver to switch lanes in accordance with an embodiment of the present invention.

Referring to FIG. 6, in conjunction with FIGS. 1-2 and 5, in step 601, a determination is made by navigation system 101 as to whether navigation system 101 should issue a recommendation to the driver to switch lanes based on the driver's preferences (obtained in step 505 of FIG. 5) as well as based on external conditions (e.g., weather) (obtained in step 507 of FIG. 7). For example, drivers that are not very good at changing lanes may need to be alerted more in advance than drivers that are very good at changing lanes. In another example, drivers may need to be informed of a lane change as soon as possible when there is a large amount of traffic versus when traffic is light. In another example, relatively good drivers may need to be alerted 300 feet in advance of a lane change; whereas, aggressive drivers may need to be alerted at only 100 feet in advance of a lane change.

If navigation system 101 determines not to issue the recommendation to the driver to switch lanes at the current moment in time, then navigation system 101 continues to determine if it should issue the recommendation to the driver to switch lanes at the next moment in time in step 601.

If, however, navigation system 101 determines to issue the recommendation to the driver to switch lanes at the current moment in time, then, in step 602, navigation system 101 issues the recommendation to the driver to switch lanes.

In some implementations, method 600 may include other and/or additional steps that, for clarity, are not depicted. Further, in some implementations, method 600 may be executed in a different order presented and that the order presented in the discussion of FIG. 6 is illustrative. Additionally, in some implementations, certain steps in method 600 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for providing lane guidance to a driver of a vehicle, the method comprising:

receiving a destination from said driver of said vehicle;

identifying a current location of said vehicle using received signals from an array of satellites which are part of a global positioning system;

determining a route to travel from said current location of said vehicle to said destination;

obtaining the following: past driving patterns of said driver of said vehicle, driver's preferences concerning lane preferences, and features of said route; and recommending, by a processor of a navigation system, to said driver of said vehicle a particular lane on said route to drive on based on said past driving patterns of said driver of said vehicle, said driver's preferences concerning lane preferences, and said features of said route, wherein said recommendation is in a form of an audio instruction or presented via text and/or graphically on a display of said navigation system.

2. The method as recited in claim 1 further comprising:
obtaining information about external conditions for traveling along said route; and
recommending to said driver of said vehicle said particular lane on said route to drive on based on said past driving patterns of said driver of said vehicle, said driver's preferences concerning lane preferences, said features of said route and said information about external conditions for traveling along said route.

3. The method as recited in claim 1 further comprising:
obtaining past driving history of other drivers on said route; and
recommending to said driver of said vehicle said particular lane on said route to drive on based on said past driving patterns of said driver of said vehicle, said driver's preferences concerning lane preferences, said features of said route and said past driving history of other drivers on said route.

4. The method as recited in claim 1, wherein said driver's preferences concerning lane preferences comprises avoiding one or more of the following: a turning lane, a merging lane, a narrow lane, a lane near a steep drop, a lane near a high cliff, a lane near construction, a lane near a low guardrail, brush fires, truck lanes, bicycle paths, uneven pavement, farm vehicles and road hazards.

5. The method as recited in claim 1, wherein said features of said route comprises one or more of the following: a number of lanes, a barrier between oncoming traffic, a width of each of said lanes of said route and a distance of a lane of said route prior to becoming a turning lane.

6. The method as recited in claim 1, wherein said past driving patterns of said driver of said vehicle comprises one or more of the following: driving towards a left side or a right side of a lane, avoiding narrow lanes, lane utilization, switching lane frequency, voluntarily merging into a lane, a driving speed in comparison to a speed limit and said driving speed in comparison to other traffic.

7. The method as recited in claim 1 further comprising:
issuing said recommendation to said driver of said vehicle at a particular moment in time based on said driver's preferences and external conditions.

8. A computer program product embodied in a computer readable storage medium for providing lane guidance to a driver of a vehicle, the computer program product comprising the programming instructions for:
receiving a destination from said driver of said vehicle;
identifying a current location of said vehicle using received signals from an array of satellites which are part of a global positioning system;
determining a route to travel from said current location of said vehicle to said destination;
obtaining the following: past driving patterns of said driver of said vehicle, driver's preferences concerning lane preferences, and features of said route; and
recommending to said driver of said vehicle a particular lane on said route to drive on based on said past driving patterns of said driver of said vehicle, said driver's preferences concerning lane preferences, and said features of said route, wherein said recommendation is in a form of an audio instruction or presented via text and/or graphically on a display of a navigation system.

9. The computer program product as recited in claim 8 further comprising the programming instructions for:
obtaining information about external conditions for traveling along said route; and
recommending to said driver of said vehicle said particular lane on said route to drive on based on said past driving patterns of said driver of said vehicle, said driver's preferences concerning lane preferences, said features of said route and said information about external conditions for traveling along said route.

10. The computer program product as recited in claim 8 further comprising the programming instructions for:
obtaining past driving history of other drivers on said route; and
recommending to said driver of said vehicle said particular lane on said route to drive on based on said past driving patterns of said driver of said vehicle, said driver's preferences concerning lane preferences, said features of said route and said past driving history of other drivers on said route.

11. The computer program product as recited in claim 8, wherein said driver's preferences concerning lane preferences comprises avoiding one or more of the following: a turning lane, a merging lane, a narrow lane, a lane near a steep drop, a lane near a high cliff, a lane near construction, a lane near a low guardrail, brush fires, truck lanes, bicycle paths, uneven pavement, farm vehicles and road hazards.

12. The computer program product as recited in claim 8, wherein said features of said route comprises one or more of the following: a number of lanes, a barrier between oncoming traffic, a width of each of said lanes of said route and a distance of a lane of said route prior to becoming a turning lane.

13. The computer program product as recited in claim 8, wherein said past driving patterns of said driver of said vehicle comprises one or more of the following: driving towards a left side or a right side of a lane, avoiding narrow lanes, lane utilization, switching lane frequency, voluntarily merging into a lane, a driving speed in comparison to a speed limit and said driving speed in comparison to other traffic.

14. The computer program product as recited in claim 8 further comprising the programming instructions for:
issuing said recommendation to said driver of said vehicle at a particular moment in time based on said driver's preferences and external conditions 15. A navigation system, comprising:
a memory unit for storing a computer program for providing lane guidance to a driver of a vehicle; and
a processor coupled to said memory unit, wherein said processor, responsive to said computer program, comprises:
circuitry for receiving a destination from said driver of said vehicle;
circuitry for identifying a current location of said vehicle using received signals from an array of satellites which are part of a global positioning system;
circuitry for determining a route to travel from said current location of said vehicle to said destination;
circuitry for obtaining the following: past driving patterns of said driver of said vehicle, driver's preferences concerning lane preferences, and features of said route; and
circuitry for recommending to said driver of said vehicle a particular lane on said route to drive on based on said past driving patterns of said driver of said vehicle, said driver's preferences concerning lane preferences, and said features of said route, wherein said recommendation is in a form of an audio instruction or presented via text and/or graphically on a display of a navigation system.

16. The navigation system as recited in claim 15, wherein said processor further comprises:
   circuitry for obtaining information about external conditions for traveling along said route; and
   circuitry for recommending to said driver of said vehicle said particular lane on said route to drive on based on said past driving patterns of said driver of said vehicle, said driver's preferences concerning lane preferences, said features of said route and said information about external conditions for traveling along said route.

17. The navigation system as recited in claim 15, wherein said processor further comprises:
   circuitry for obtaining past driving history of other drivers on said route; and
   circuitry for recommending to said driver of said vehicle said particular lane on said route to drive on based on said past driving patterns of said driver of said vehicle, said driver's preferences concerning lane preferences, said features of said route and said past driving history of other drivers on said route.

18. The navigation system as recited in claim 15, wherein said driver's preferences concerning lane preferences comprises avoiding one or more of the following: a turning lane, a merging lane, a narrow lane, a lane near a steep drop, a lane near a high cliff, a lane near construction, a lane near a low guardrail, brush fires, truck lanes, bicycle paths, uneven pavement, farm vehicles and road hazards.

19. The system as recited in claim 15, wherein said features of said route comprises one or more of the following: a number of lanes, a barrier between oncoming traffic, a width of each of said lanes of said route and a distance of a lane of said route prior to becoming a turning lane.

20. The system as recited in claim 15, wherein said past driving patterns of said driver of said vehicle comprises one or more of the following: driving towards a left side or a right side of a lane, avoiding narrow lanes, lane utilization, switching lane frequency, voluntarily merging into a lane, a driving speed in comparison to a speed limit and said driving speed in comparison to other traffic.

* * * * *